United States Patent
Gerdes et al.

(10) Patent No.: US 10,040,434 B2
(45) Date of Patent: Aug. 7, 2018

(54) ELECTROMECHANICAL BRAKE BOOSTER AND METHOD FOR OPERATING AN ELECTROMECHANICAL BRAKE BOOSTER

(71) Applicant: Robert Bosch GmbH, Stuttgart (DE)

(72) Inventors: Manfred Gerdes, Vaihingen/Enz (DE); Herbert Vollert, Vaihingen/Enz (DE)

(73) Assignee: ROBERT BOSCH GMBH, Stuttgart (DE)

(*) Notice: Subject to any disclaimer, the term of this patent is extended or adjusted under 35 U.S.C. 154(b) by 437 days.

(21) Appl. No.: 14/741,982

(22) Filed: Jun. 17, 2015

(65) Prior Publication Data
US 2015/0360666 A1    Dec. 17, 2015

(30) Foreign Application Priority Data
Jun. 17, 2014    (DE) ..................... 10 2014 211 551 U

(51) Int. Cl.
*B60T 13/74*    (2006.01)
*B60T 7/04*    (2006.01)
(Continued)

(52) U.S. Cl.
CPC .............. *B60T 7/06* (2013.01); *B60T 11/18* (2013.01); *B60T 13/575* (2013.01)

(58) Field of Classification Search
CPC .......... B60T 7/06; B60T 11/18; B60T 13/575; B60T 13/74
(Continued)

(56) References Cited

U.S. PATENT DOCUMENTS 6,774,595 B1 *  8/2004  Laxhuber ............... B60T 13/74
                                                    303/20
8,380,412 B2 *  2/2013  Vollert ................... B60T 13/662
                                                    137/627.5
(Continued)

FOREIGN PATENT DOCUMENTS

EP    2 379 376    10/2011

OTHER PUBLICATIONS

Modus ("Why Rubber is Used for Vibration and Shock Isolation", Feb. 3, 2014, e-publication retrieved from https://www.modusadvanced.com on Feb. 6, 2018).*

*Primary Examiner* — Michael Leslie
*Assistant Examiner* — Richard Drake
(74) *Attorney, Agent, or Firm* — Norton Rose Fulbright US LLP; Gerard Messina

(57) ABSTRACT

An electromechanical brake booster is provided for a braking system of a vehicle, having a valve body and an input rod, the valve body, to which at a displacement motion in a brake application direction has been imparted, being displaceable up to a differential travel equal to a limit differential travel with reference to the input rod, and then a co-displacement motion in the brake application direction being impartable to the input rod if the co-displacement motion is acted against at most by a retention force below a predefined threshold value, and at least one buffer element being disposed on the input rod and/or on the valve body in such a way that if a retention force above the predefined threshold value acts against the co-displacement motion, the differential travel is increasable above the limit differential travel by way of a deformation of the at least one buffer element.

16 Claims, 3 Drawing Sheets

(51) Int. Cl.
*B60T 7/06* (2006.01)
*B60T 11/18* (2006.01)
*B60T 13/575* (2006.01)

(58) Field of Classification Search
USPC .......................................................... 60/545
See application file for complete search history.

(56) References Cited

U.S. PATENT DOCUMENTS

| | | | | |
|---|---|---|---|---|
| 8,632,136 | B2 * | 1/2014 | Nozawa | B60T 1/10 |
| | | | | 303/115.2 |
| 8,662,602 | B2 * | 3/2014 | Nishino | B60T 7/042 |
| | | | | 303/122.05 |
| 2008/0231109 | A1 * | 9/2008 | Yamada | B60T 8/3265 |
| | | | | 303/20 |
| 2009/0261649 | A1 * | 10/2009 | Higuma | B60T 8/4275 |
| | | | | 303/113.3 |
| 2010/0275593 | A1 * | 11/2010 | Okada | B60T 13/745 |
| | | | | 60/545 |
| 2011/0297493 | A1 * | 12/2011 | Vollert | B60T 7/042 |
| | | | | 188/106 R |
| 2013/0025273 | A1 * | 1/2013 | Nozawa | B60T 7/042 |
| | | | | 60/545 |

* cited by examiner

ELECTROMECHANICAL BRAKE BOOSTER AND METHOD FOR OPERATING AN ELECTROMECHANICAL BRAKE BOOSTER

FIELD OF THE INVENTION

The present invention relates to an electromechanical brake booster for a braking system of a vehicle. The invention likewise relates to a braking system for a vehicle. The invention furthermore relates to a method for operating an electromechanical brake booster for a braking system of a vehicle.

BACKGROUND INFORMATION

Electromechanical brake boosters are known from the existing art. European Patent No. 2 379 376 B1, for example, describes an electromechanical brake booster having an input rod attachable to a brake pedal and having as actuator a piston displaceable by way of an operating mode of a motor. The input rod and the piston each individually contact a reaction disk by way of which a driver braking force transferred to the input rod, and/or a booster force transferred by way of the motor operating mode to the piston, are transferrable to a pressure rod/output rod. A brake pressure in a brake master cylinder is intended to be increasable by way of a displacement, thereby effected, of the pressure rod. In addition, automatic braking by way of an operating mode of the motor of the electromechanical brake booster is also intended to be effectable even without actuation of the brake actuation element.

SUMMARY

The invention creates an electromechanical brake booster for a braking system of a vehicle; a braking system for a vehicle; and a method for operating an electromechanical brake booster for a braking system of a vehicle.

The present invention creates an electromechanical brake booster in which, in the case of restraint and/or blockage of its input rod or of a brake actuation element (e.g. a brake pedal) attached thereto, the differential travel between the valve body and the input rod is additionally increasable by way of a deformation of the at least one buffer element. This ensures on the one hand a capability for detecting the restraint/blockage, and at the same time a capability for reducing a risk of injury and/or damage during operation of the motor.

By way of the electromechanical brake booster according to the present invention and the corresponding method for operating the electromechanical brake booster, automatic braking can be effected by imparting to the valve body a displacement motion in the brake application direction. An automated braking operation of this kind is executable without actuation by a driver of the brake actuation element disposed on the input rod. The automated braking operation can also be referred to as "autonomous braking," "automatic brake pressure buildup," "autonomous brake pressure buildup," and/or "external-force braking" As a result of the co-displaceability of the input rod together with the valve body, a motion identical/similar to an actuation of the brake actuation element by the driver can also be imparted to the associated brake actuation element. Jamming of objects as a result of the effected motion of the brake actuation element, especially jamming of objects in a gap between the brake actuation element located in its initial position and an adjacent vehicle partition component, can nevertheless be detected and thus prevented by way of the present invention. It is also possible to ensure by way of the present invention that a restraint/blockage of the brake actuation element which occurs conventionally in such a situation does not result in any damage to components of the braking system.

In an advantageous embodiment of the electromechanical brake booster, the at least one buffer element encompasses at least one compression element that is disposed at at least one abutment surface, contactable by the input rod, of the valve body and/or at at least one abutment surface, contactable by the valve body, of the input rod. By way of a compression of the at least one compression element, the differential travel can be increased above the limit differential travel in such a way that the presence of a restraint or blockage of the input rod or of the brake actuation element disposed thereon can be ascertained by way of a suitable detection. At the same time, by way of the compression of the at least one compression element at a point in time at which conventionally a significant force is already being exerted on an object contacted by the brake actuation element, undesired jamming or stoppage of the object is prevented. Damage that often conventionally occurs to at least one component of the braking system can correspondingly be can be prevented as a result of the compression of the at least one compression element at the given point in time.

The at least one compression element can be constituted from at least one elastic material. The at least one compression element can thus be manufactured economically.

The at least one buffer element can likewise encompass at least one confined or encapsulated tension spring element that is retained between the input rod and the valve body. As an alternative or an addition thereto, the at least one buffer element can also encompass at least one confined or encapsulated compression spring element that is retained between the input rod and the valve body. The exemplifying embodiments described here for the at least one buffer element also ensure the advantages already described above.

In a further advantageous embodiment the electromechanical brake booster encompasses an internal electronic evaluation system that is designed to compare at least one self-ascertained and/or externally furnished variable with regard to the differential travel between the valve body and the input rod with at least one comparison variable corresponding to the limit differential travel. In this case the internal electronic evaluation system is preferably designed to output, if the at least one variable falls below or exceeds the at least one comparison variable, at least one control application signal to a warning display apparatus and/or to a warning sound output apparatus and/or to output at least one control signal to the electromechanical brake booster. In this manner, for example, the driver can also be informed sufficiently promptly as to an object projecting into the gap between the brake actuation element and the adjacent vehicle partition component that the respective object can be removed from the gap before jamming and before damage to at least one component of the braking system.

In addition, control is applicable to the electromechanical brake booster by way of the at least one control signal of the electronic evaluation system in such a way that the electromechanical brake booster is controllable out of its current operating mode into a safety mode at least for a predefined first time interval, or is interruptible in its operation at least for a predefined second time interval. Jamming/stoppage of the object projecting into the gap can thus reliably be prevented by way of such modifications to the operation of the electromechanical brake booster, even if the driver does not react to the activated warning display apparatus and/or warning sound output apparatus. The risk of damage to at least one component of the braking system in a context of restraint or blockage of the input rod can correspondingly also be significantly reduced by way of the operating mode, modified in this manner, of the electromechanical brake booster.

A braking system for a vehicle having an electromechanical brake booster of this kind also creates the advantages described above.

In a possible embodiment in which the electromechanical brake booster does not encompass the above-described internal electronic evaluation system, the braking system can encompass at least one electronics device disposed externally from the electromechanical brake booster, the electronics device being designed to compare at least one self-ascertained and/or externally furnished variable regarding the differential travel between the valve body and the input rod with at least one comparison value corresponding to the limit differential travel and, if the at least one variable falls below or exceeds the at least one comparison variable, to output at least one activation signal to a warning display apparatus and/or to a warning sound output apparatus and/or to output at least one control signal to the electromechanical brake booster. The electronics device thus also creates the advantages, already described above, of the internal electronic evaluation system.

Embodiment of a corresponding method for operating an electromechanical brake booster for a braking system of a vehicle furthermore also achieves the advantages described above. It is noted that the method can be further developed in accordance with the above-described embodiments of the electromechanical brake booster and of the braking system equipped therewith.

DETAILED DESCRIPTION

Figure 1A:
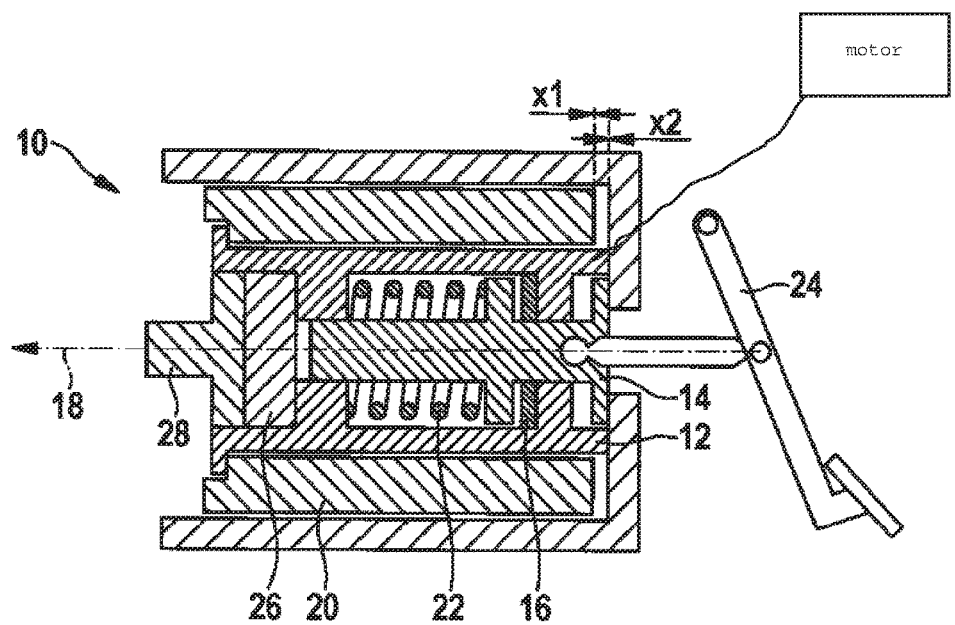
FIGS. 1a to 1d schematically depict an embodiment of the electromechanical brake booster according to the present invention.

FIGS. 1a to 1d schematically depict an embodiment of the electromechanical brake booster.

Electromechanical brake booster 10 reproduced schematically in FIGS. 1a to 1d is not limited in terms of its usability to a specific type of brake system. It is also noted that a braking system equipped with electromechanical brake booster 10 is usable in a plurality of different types of vehicle.

Electromechanical brake booster 10 encompasses a valve body 12 and an input rod 14. Electromechanical brake booster 10 depicted in FIGS. 1a to 1d further has at least one buffer element 16 that is disposed on input rod 14 and/or on valve body 12, and whose manner of operation will be discussed in further detail below.

At least a displacement motion in a brake application direction 18 is impartable to valve body 12 by way of an operating mode of a motor (not depicted). Another way to paraphrase this is to say that valve body 12 is displaceable, by way of a booster force exerted thereon by the motor, from its (zero-force) initial position over a booster travel x1 in brake application direction 18. The motor usable for the displacement of valve body 12 can be a motor (as a sub-unit) of electromechanical brake booster 10 or a motor (embodied as a separate compact unit) placeable externally on electromagnetic brake booster 10.

By way of example, in the embodiment described here, valve body 12 is connected/connectable to the motor via at least one booster body 20 in such a way that the displacement motion in brake application direction 18 can be imparted to valve body 12 by way of a motion of booster body 20 caused by the operation of the motor. As an alternative or supplement to booster body 20, valve body 12 can also be connected/connectable to the motor via a thread (not depicted).

In the embodiment described here, input rod 14 is braced via a return spring 22 against valve body 12. It is noted, however, that equipping electromechanical brake booster 10 with return spring 22 is merely optional. As depicted in FIG. 1a, a brake actuation element 24, for example a brake pedal 24, is attachable or attached to input rod 14. A driver braking force is transferrable to input rod 14 by way of an actuation of brake actuation element 24 by a driver. By way of the transferred driver braking force, input rod 14 is displaceable out of its (zero-force) initial position over an input-rod travel x2.

In the embodiment depicted, input rod 14 and valve body 12 each contact a first side of a reaction disk 26. An output rod 28 (only partly depicted) is disposed on a second side, oriented oppositely to the first side, of reaction disk 26. Output rod 28 is displaceable, by way of the driver braking force transferred thereto via input rod 14 and/or the booster force, transferred thereto via valve body 12, of the motor/electromechanical brake booster 10, in such a way that a brake master cylinder pressure in at least one brake master cylinder disposed on electromechanical brake booster 10 can be increased. A depiction of the brake master cylinder in FIG. 1a is omitted, however, since electromechanical brake booster 10 is not limited to a specific type of brake master cylinder interacting therewith. It is moreover noted that the equipping of electromechanical brake booster 10 with reaction disk 26 and with output rod 28, as reproduced in FIG. 1a, is to be interpreted merely as an example.

Figure 1B:
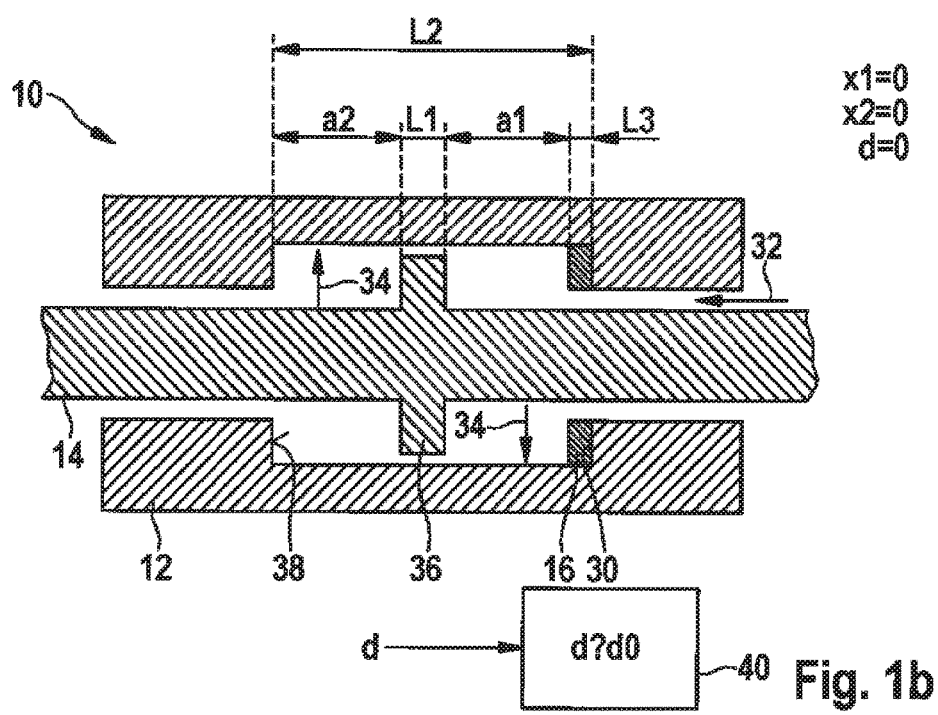

FIG. 1b schematically depicts electromechanical brake booster 10 of FIG. 1a while the motor (embodied as a sub-unit of electromechanical brake booster 10 or located/locatable externally on electromechanical brake booster 10) is in a deactivated state and when brake actuation element 24 is in its initial position, or in a context of non-actuation of brake actuation element 24 by the driver. Another way to paraphrase this is to say that the driver braking force exerted on input rod 14 is equal to zero, and the booster force exerted on valve body 12 is equal to zero. The booster travel x1 and input rod travel x2 are correspondingly also equal to zero in the situation reproduced in FIG. 1b. In addition, in the situation depicted in FIG. 1b a differential travel d present between input rod 14 and valve body 12 is equal to zero. The "differential travel" d can be understood, for example, as a difference in the position of input rod 14 with respect to valve body 12, which is directly measurable in particular via a differential travel sensor. (The differential travel can be defined, for example, as a difference d between booster travel x1 and input rod travel x2, possibly also with a constant.)

Figure 1C:
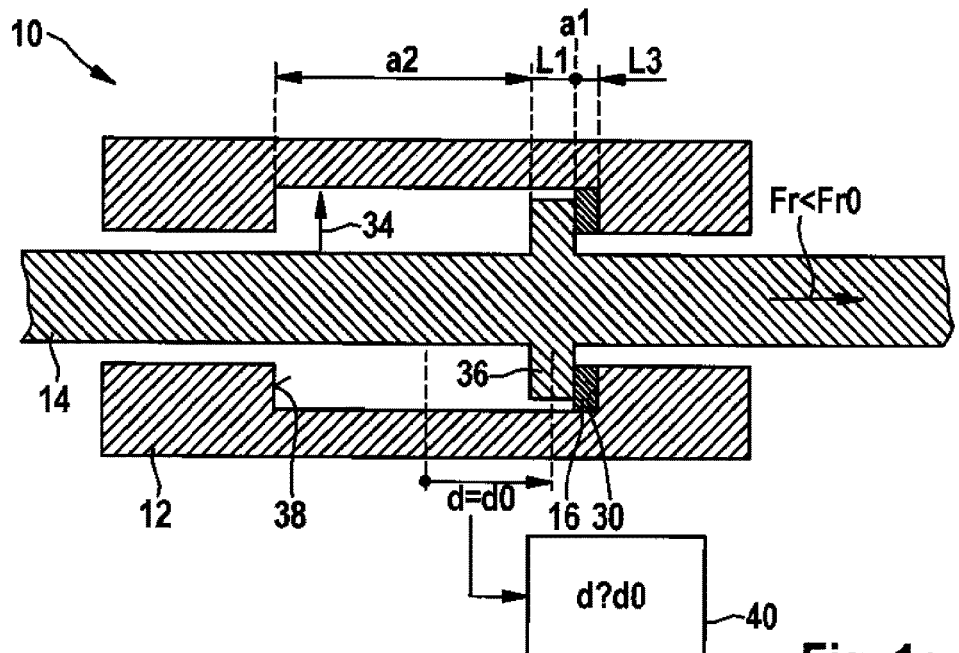

FIG. 1c shows electromechanical brake booster 10 during an automatic braking operation. "Automatic braking" is to be understood as an operation in which a brake pressure is built up in at least one wheel brake cylinder of the braking system equipped with electromechanical brake booster 10 with no actuation of brake actuation element 24 by the driver. Automatic braking operation can be triggered, for example, by a driver assistance system (e.g. an adaptive cruise control system (ACC)) and/or by an emergency braking system (for example an autonomous emergency braking system (AEB)). Electromechanical brake booster 10 can in particular be embodied in such a way that a force/energy required in order to execute the automatic braking operation can be applied exclusively by way of electromechanical brake booster 10 or by way of the motor used to operate electromechanical brake booster 10. It is thus not necessary to equip the braking system that is equipped with electromechanical brake booster 10 with a further motor device/hydraulic device in order to execute automatic braking. The multifunctionality of electromechanical brake booster 10 thus reduces an installation space requirement, a weight, and manufacturing costs of the braking system equipped therewith. Alternatively, however, the electromechanical brake booster can also be designed merely to intensify the automatic braking operation. In this case automatic braking is accomplished by way of an interaction of electromechanical brake booster 10 with at least one valve of the braking system, at least one converter apparatus of the braking system, e.g. a plunger, and/or at least one pump of the braking system.

For execution/intensification of the automatic braking operation, the displacement motion in brake application direction 18 is imparted to valve body 12 by way of an operating mode of the motor. Input rod 14 is mounted on valve body 12 in such a way that valve body 12, to which the displacement motion (out of its initial position) in brake application direction 18 has been applied, is displaceable up to a differential travel d, present between input rod 14 and valve body 12, equal to a limit differential travel d0 with reference to input rod 14. In the situation schematically reproduced in FIG. 1c, a co-displacement motion in brake application direction 18 is then impartable to input rod 14 by way of valve body 12 to which the displacement motion in brake application direction 18 has been imparted. Preferably the co-displacement motion of input rod 14 in brake application direction 18 can be executed while conforming to the differential travel d equal to the limit differential travel d0. The co-displacement of input rod 14 (together with valve body 12) in brake application direction 18 which is schematically depicted in FIG. 1c occurs, however, only if the co-displacement motion of input rod 14 in brake application direction 18 is acted against at most by a retention force Fr below a predefined threshold value Fr0.

Usually the co-displacement motion of input rod 14 in brake application direction 18 causes a motion of brake actuation element 24 identical/similar to a corresponding actuation of brake actuation element 24 by the driver. Often the motion of brake actuation element 24 occurs in highly dynamic fashion. This is the case especially in the context of automatic full braking. It can happen, however, that at least one object, for example a driver's foot, a bottle, and/or a pet, is located close to brake actuation element 24. It is possible most of all for the respective object to project at least partly into a gap between brake actuation element 24 and an adjacent vehicle partition. Such a situation generally produces a force directed oppositely to the motion of brake actuation element 24. This also results in a retention force Fr on input rod 14 which acts against the co-displacement motion of input rod 14 in input direction 18 (together with valve body 12).

In the situation reproduced by way of FIG. 1c, however, an interfering object is not located on brake actuation element 24. The retention force Fr acting on input rod 14 is thus less than the predefined threshold value Fr0. (The retention force Fr below the predefined threshold value Fr0 can result, for example, from a friction of input rod 14.)

Figure 1D:
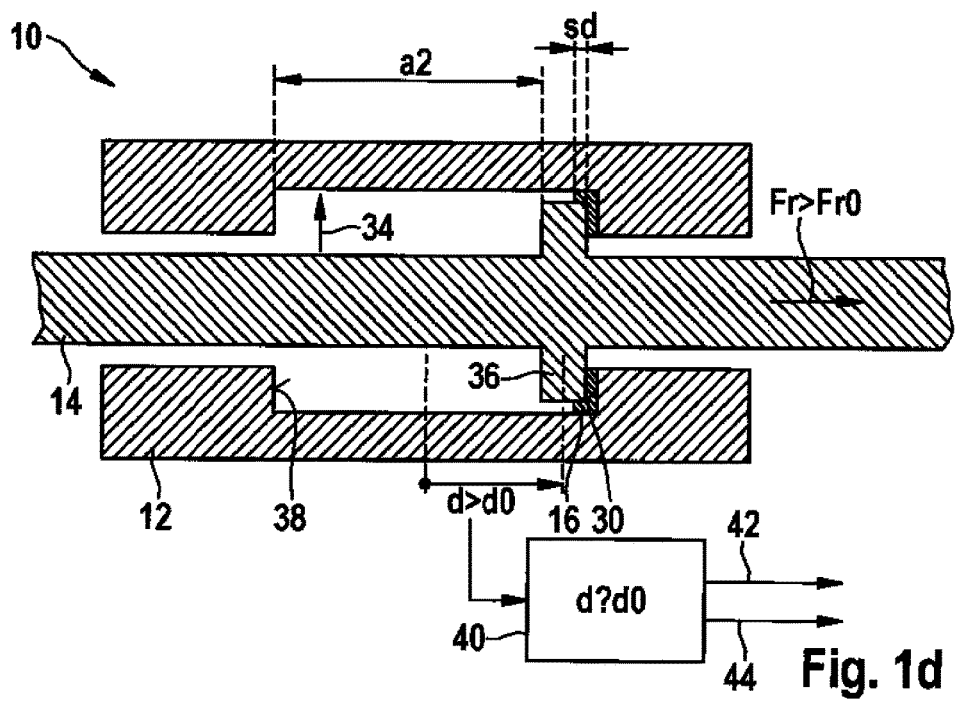

FIG. 1d, conversely, reproduces a situation in which an object is projecting into the gap between brake actuation element 24 and the adjacent vehicle partition component. As soon as contact exists between brake actuation element 24 and the respective object, as a rule a significant retention force Fr, exerted on input rod 14, occurs. Advantageously, the predefined threshold value Fr0 at electromechanical brake booster 10 is specified in such a way that the retention force Fr that occurs beginning with contact between brake actuation element 24 and the object is above the predefined threshold value Fr0.

Because electromechanical brake booster 10 is equipped with the at least one buffer element 16, however, jamming, squeezing, or hard abutment of the object can be reliably prevented. The at least one buffer element 16 ensures that if, during the displacement motion of valve body 12 in brake application direction 18, the co-displacement motion of input rod 14 in brake application direction 18 is acted against by a retention force Fr above the predefined threshold value Fr0, the differential travel d between valve body 12, to which the displacement motion in input direction 18 has been imparted, and input rod 14 can be increased by way of a deformation of the at least one buffer element 16 above the predefined limit differential travel d0. For this purpose, for example, the at least one buffer element 16 is embodied in such a way that the at least one buffer element 16 is deformable, starting at a force exerted thereon corresponding to the threshold value Fr0, out of its respective initial shape in such a way that the differential travel d can be increased by way of a further displacement of valve body 12 with respect to input rod 14 above the limit differential travel d0. In addition, the at least one buffer element 16 can be embodied so that the at least one buffer element 16 remains (almost) in its respective initial shape despite a force exerted thereon that corresponds to a retention force Fr below the predefined threshold value Fr0.

The increase in the differential travel d above the predefined limit differential travel d0 which is triggered at electromechanical brake booster 10 (when the retention force Fr exerted on input rod 14 exceeds the predefined threshold value Fr0) enables prompt detection/recognition of the restraint or blockage of input rod 14 (or of brake actuation element 24). Thanks to the prompt detectability of an interference situation of this kind, it can be eliminated promptly even before damage/defects on the interference object occur. The interference situation can also be eliminated even before damage occurs to at least one component of the braking system equipped with electromechanical brake booster 10, in particular before damage to at least one component of electromechanical brake booster 10. It is furthermore noted that by way of the achievable increase in the differential travel d above the predefined limit differential travel d0 at a point in time at which conventionally a hard contact between brake actuation element 24 and the interfering object is already occurring, a "soft" contact between brake actuation element 24 and the interfering object can still be ensured by way of the deformation of the at least one buffer element 16. (The energy absorbable by way of the deformation of the at least one buffer element 16 thus does not act on the interfering object and/or on a component of the braking system).

The threshold value Fr0 can easily and reliably be specified at a desired value by way of the configuration of the at least one buffer element 16. All that is necessary for this is to embody the at least one buffer element 16 in such a way that it is deformable out of its original shape only above a force exerted thereon that corresponds to the desired threshold value Fr0, while a deformation of the at least one buffer element 16 that is in its original shape at a lower force is (almost) suppressed.

In the embodiment of FIGS. 1a to 1d, the at least one buffer element 16 is at least one compression element 16 that is disposed on at least one abutment surface 30, contactable by input rod 14, of valve body 12. As an alternative or supplement thereto, electromechanical brake booster 10 can also have at least one further compression element that is disposed on an abutment surface, contactable by valve body 12, of input rod 14. The at least one compression element 16 can also be disposed on valve body 12, and the at least one further compression element on input rod 14, in such a way that the at least one compression element adhering to valve body 12 and the at least one further compression element mounted on input rod 14 can abut against one another.

By way of example, in the embodiment of FIGS. 1a to 1d the at least one compression element 16 is constituted from at least one elastic material, for example an elastomer and/or a rubber. The at least one compression element 16 can thus be manufactured economically. At the same time, with such an embodiment of the at least one compression element 16 it is possible to specify the threshold value Fr0 at a desired value. The range of embodiment of the at least one compression element 16 is not limited, however, to a specific elastic material.

Instead of or as a supplement to the above-described range of embodiment of the at least one buffer element 16, the latter can also encompass at least one confined or encapsulated tension spring element that is retained between input rod 14 and valve body 12. For example, the at least one confined or encapsulated tension spring element can extend from at least one first anchoring point on input rod 14 in a direction toward a side of electromechanical brake booster 10 which is oriented/orientable toward the brake master cylinder, to at least one second anchoring point on valve body 12.

The at least one buffer element can furthermore encompass at least one confined or encapsulated compression spring element that is retained between input rod 14 and valve body 12. In this case the at least one confined or encapsulated compression spring element advantageously extends from at least one third anchoring point on input rod 14 in a direction toward a side of electromechanical brake booster 10 which is oriented/orientable toward brake actuation element 24, to at least one fourth anchoring point on valve body 12. It is also relatively simple to specify the threshold value Fr0 at a desired value by way of at least one such confined or encapsulated compression and/or tension spring element.

In the embodiment of FIGS. 1a to 1d, valve body 12 has a passthrough orifice 32 having an (annular) enlargement 34. The advantageous attachment of input rod 14 on valve body 12 is effected by the fact that input rod 14 extends at least in part through orifice 32. In particular, a confinement region 36 of input rod 14 extends into the (annular) enlargement 34. Confinement region 36 of input rod 14 can also be referred to as an (annular) protrusion on input rod 14 or as a "key." (Confinement region 36 has, along input rod 14, a first length L1 that is shorter than a second length L2 of the (annular) enlargement 34 along input rod 14.) The advantageous attachment of input rod 14 on valve body 12 can also be paraphrased as a mounting of input rod 14 in valve body 12.

The confinement/key ensures that confinement region 36 of input rod 14 can move within valve body 12 only within certain limits predefined by the (annular) enlargement 34. (The advantageous attachment of input rod 14 on valve body 12 additionally ensures protection of the adjacent components.)

In the situation reproduced in FIG. 1b, i.e. for a differential travel d equal to zero, confinement region 36 is located by way of example at a first distance a1 from the at least one buffer element 16 and at a second distance a2 from an oppositely directed (with reference to confinement region 36) surface 38 of valve body 12. (In particular, a sum of the first distance a1, the second distance a2, the first length L1 of confinement region 36, and a third length L3 of the at least one buffer element 16 along input rod 14 can be equal to the second length L2 of the (annular) enlargement 34.) A displacement of valve body 12 with reference to input rod 14 at the beginning of autonomous braking causes a decrease in the first distance a1 and a corresponding increase in the second distance a2 (until contact between confinement region 36 and stop surface 30), as depicted in FIG. 1c. If the retention force Fr exerted on input rod 14 is below the predefined threshold value Fr0, input rod 14 is then co-displaceable in braking direction 18 (together with valve body 12) (almost) without any deformation of the at least one buffer element 16. Otherwise confinement region 36 of input rod 14 can be pushed into the at least one buffer element 16 over a deformation travel sd by which the second distance a2 can additionally be increased. It is noted, however, that the confinement, depicted in FIGS. 1a to 1d, of input rod 14 on valve body 12 is to be interpreted merely as an example.

Electromechanical brake booster 10 schematically depicted in FIGS. 1a to 1b is designed for interaction with an electronics device 40. Electronics device 40 is disposed, by way of example, externally from electromechanical brake booster 10. Alternatively thereto, however, electronics device 40 can also be integrated into the electromechanical brake booster as an electronic evaluation system.

Electronics device 40 is designed to compare at least one self-ascertained and/or externally furnished variable regarding the differential travel d between valve body 12 and input rod 14 with at least one comparison variable corresponding to the limit differential travel d0. The comparison variable can be stored, for example, on an internal memory unit of electronics device 40. If the at least one variable falls below or exceeds the at least one comparison variable, i.e. if the current differential travel d exceeds the limit differential travel d0, the electronic evaluation system is designed to output at least one control signal 42 to electromechanical brake booster 10 or to its motor. For example, electromechanical brake booster 10 (or its motor) can have control applied to it by way of the at least one control signal 42 of electronics device 40 in such a way that electromechanical brake booster 10 is controllable out of its current operating mode into a safety mode (at least for a predefined first time interval), or that its operation can be interrupted (at least for a predefined second time interval). In the safety mode of electromechanical brake booster 10, optionally a rotation speed of the motor, a number of motor rotations, a predefined maximum displacement angle of the motor, a predefined maximum booster travel of booster travel x1, and or a booster force exerted on valve body 12 by way of operation of the motor can be reduced (as compared with the current operating mode). In a special embodiment, the at least one control signal 42 can likewise bring about an (at least brief) interruption in operation of the motor. A reversal of the motor/electromechanical brake booster 10 can also be triggerable by way of the at least one control signal 42. As an alternative or supplement to the output of the at least one control signal 42, electronics device 40 can also be designed to output at least one activation signal 44 to a warning display apparatus (not illustrated) and/or to a warning sound output apparatus (not depicted).

The at least one compared variable can be, in particular, a differential travel sensor signal of a differential travel sensor. It is noted, however, that instead of the differential travel d ascertained directly as the at least one variable, a variable corresponding to the differential travel d can also be employed for comparison. The at least one variable can likewise also reproduce an estimated value, derived from at least one sensor signal, of the differential travel d.

A braking system equipped with electromechanical brake booster 10 and with electronics device 40 also makes possible a combination of mechanical adaptation and advantageous sensor technology for reliably preventing the occurrence of material damage or injury in a context of restraint/blockage of input rod 14.

Figure 2:
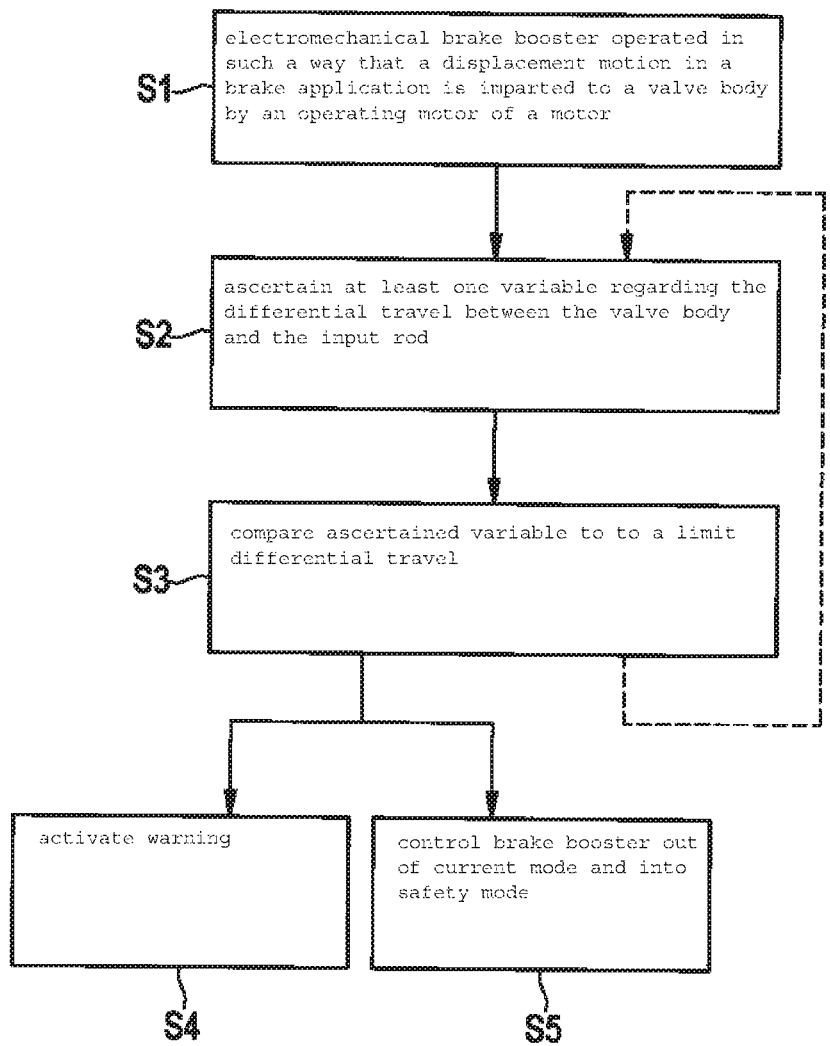
FIG. 2 is a flow chart to explain an embodiment of the method for operating an electromechanical brake booster for a braking system of a vehicle.

FIG. 2 is a flow chart to explain an embodiment of the method for operating an electromechanical brake booster for a braking system of a vehicle.

The method described below can be executed, for example, by way of the electromechanical brake booster explained above. It is noted, however, that the executability of the method is not limited to a specific type of electromechanical brake booster, type of braking system equipped therewith, or type of respective vehicle.

In a method step S1 the electromechanical brake booster is operated in such a way that a displacement motion in a brake application direction is imparted to a valve body of the electromechanical brake booster by an operating mode of a motor disposed (as a separate component) externally on the electromechanical brake booster or embodied as a sub-unit of the electromechanical brake booster. As a result, the valve body to which the displacement motion in the braking direction has been imparted is displaced up to a differential travel, existing between the input rod and the valve body, which is equal to a predefined limit differential travel with reference to the input rod. Subsequently, if a retention force that acts against a co-displacement motion in the brake application direction of an input rod mounted on the valve body is not present or is below a predefined threshold value, the co-displacement motion in the brake application is imparted to the input rod by way of the valve body to which the displacement motion in the brake application direction has been imparted. If, however, the retention force acting against the co-displacement motion of the input rod in the brake application direction is above the predefined threshold value, the differential travel between the valve body, to which the displacement motion in the brake application direction has been imparted, and the input rod is increased above the predefined limit differential travel by way of a deformation of at least one buffer element on the input rod and/or on the valve body.

In a method step S1 executed at least once during operation of the electromechanical brake booster (i.e. during method step S1), at least one variable regarding the differential travel between the valve body and the input rod is ascertained. For example, a direct measurement of the differential travel, an estimate of the differential travel, and/or a measurement or derivation of the variable corresponding to the differential travel can be accomplished in method step S2.

In a further method step S3 the at least one variable is compared with at least one comparison variable corresponding to a limit differential travel. If the at least one variable falls below or exceeds the at least one comparison variable, i.e. if a current differential travel above the limit differential travel is (directly or indirectly) detected, at least one of method steps S4 and/or S5 is executed. In a method step S4, a warning display apparatus and/or a warning sound output apparatus are activated. In a method step S5 the electromechanical brake booster is controlled out of its current operating mode into a safety mode at least for a predefined first time interval, and/or operation of the electromechanical brake booster is interrupted at least for a predefined second time interval.

If it is ascertained in method step S3 that the at least one variable is within a normal value range predefined by way of the at least one comparison variable, method steps S2 and S3 are repeated at least once.

The method described here also achieves the advantages described above, which will not be listed again.

What is claimed is:

1. An electromechanical brake booster for a braking system of a vehicle, comprising:
   a valve body to which at least a displacement motion in a brake application direction is impartable by way of an operating mode of a motor, one of placeable externally on the electromechanical brake booster and embodied as a sub-unit of the electromechanical brake booster;
   an input rod mounted on the valve body in such a way that the valve body to which the displacement motion in the brake application direction has been imparted is displaceable up to a differential travel, existing between the input rod and the valve body, equal to a predefined limit differential travel with reference to the input rod, and then a co-displacement motion in the brake application direction is impartable to the input rod, by way of the valve body to which the displacement motion in the brake application direction has been imparted, if the co-displacement motion of the input rod in the brake application direction is acted against at most by a retention force below a predefined threshold value;
   at least one buffer element disposed at least one of on the input rod and on the valve body in such a way that if, during the displacement motion of the valve body in the brake application direction, a retention force above the predefined threshold value acts against the co-displacement motion of the input rod in the brake application direction, the differential travel between the valve body, to which the displacement motion in the brake application direction has been imparted, and the input rod, is increasable above the predefined limit differential travel by way of a deformation of the at least one buffer element; and
   an internal electronic evaluation system designed to: compare a value representing the differential travel between the valve body and the input rod with at least one comparison variable representing the predefined limit differential travel, determine, based on the comparing, if the differential travel between the valve body and the input rod is above the predefined limit differential travel, and, if the differential travel between the valve body and the input rod is above the predefined limit differential travel, output at least one of:
   (i) at least one activation signal to at least one of a warning display apparatus and a warning sound output apparatus, and (ii) at least one control signal to the electromechanical brake booster;

wherein the differential travel between the valve body and the input rod is a difference between a position of the input rod with respect to a position of the valve body.

2. The electromechanical brake booster as recited in claim 1, wherein the at least one buffer element includes at least one compression element disposed at least one of:

on at least one abutment surface, contactable by the input rod, of the valve body, and on at least one abutment surface, contactable by the valve body, of the input rod.

3. The electromechanical brake booster as recited in claim 2, wherein the at least one compression element includes at least one elastic material.

4. The electromechanical brake booster as recited in claim 1, wherein the at least one buffer element includes at least one compression spring element that is one of confined and encapsulated and that is retained between the input rod and the valve body.

5. The electromechanical brake booster as recited in claim 1, wherein the internal electronic evaluation system is designed to output, if the differential travel between the valve body and the input rod is above the predefined limit differential travel, the at least one control signal, and based on the at least one control signal of the electronic evaluation system, the electromechanical brake booster is controlled out of its current operating mode into a safety mode at least for a predefined first time interval, or is interruptible in its operation at least for a predefined second time interval.

6. A braking system for a vehicle, comprising:

an electromechanical brake booster for a braking system of a vehicle, including:

a valve body to which at least a displacement motion in a brake application direction is impartable by way of an operating mode of a motor, one of placeable externally on the electromechanical brake booster and embodied as a sub-unit of the electromechanical brake booster, an input rod mounted on the valve body in such a way that the valve body to which the displacement motion in the brake application direction has been imparted is displaceable up to a differential travel, existing between the input rod and the valve body, equal to a predefined limit differential travel with reference to the input rod, and then a co-displacement motion in the brake application direction is impartable to the input rod, by way of the valve body to which the displacement motion in the brake application direction has been imparted, if the co-displacement motion of the input rod in the brake application direction is acted against at most by a retention force below a predefined threshold value, and at least one buffer element disposed at least one of on the input rod and on the valve body in such a way that if, during the displacement motion of the valve body in the brake application direction, a retention force above the predefined threshold value acts against the co-displacement motion of the input rod in the brake application direction, the differential travel between the valve body, to which the displacement motion in the brake application direction has been imparted, and the input rod, is increasable above the predefined limit differential travel by way of a deformation of the at least one buffer element; and at least one electronics device disposed externally from the electromechanical brake booster, the at least one electronics device designed to compare a value representing the differential travel between the valve body and the input rod with at least one comparison variable representing the predefined limit differential travel, determine, based on the comparing, if the differential travel between the valve body and the input rod is above the predefined limit differential travel, and, if the differential travel between the valve body and the input rod is above the predefined limit differential travel, output at least one of:

(i) at least one activation signal to at least one of a warning display apparatus and a warning sound output apparatus, and (ii) at least one control signal to the electromechanical brake booster;

wherein the differential travel between the valve body and the input rod is a difference between a position of the input rod with respect to a position of the valve body.

7. A method for operating an electromechanical brake booster for a braking system of a vehicle, comprising:

operating the electromechanical brake booster in such a way that a displacement motion in a brake application direction is imparted to a valve body of the electromechanical brake booster by way of an operating mode of a motor, placed externally on the electromechanical brake booster or embodied as a sub-unit of the electromechanical brake booster, with the result that the valve body to which the displacement motion in the brake application direction has been imparted is displaced up to a differential travel, existing between the input rod and the valve body, equal to a predefined limit differential travel with reference to the input rod, and then, if a retention force that acts against a co-displacement motion in the brake application direction of the input rod mounted on the valve body is not present or is below a predefined threshold value, the co-displacement motion in the brake application direction is imparted to the input rod by way of the valve body to which the displacement motion in the brake application direction has been imparted, and if the retention force acting against the co-displacement motion of the input rod in the brake application direction is above the predefined threshold value, the differential travel between the valve body, to which the displacement motion in the brake application direction has been imparted, and the input rod is increased above the predefined limit differential travel by way of a deformation of at least one buffer element on at least one of the input rod and the valve body;

ascertaining the differential travel between the valve body and the input rod during operation of the electromechanical brake booster;

comparing the ascertained differential travel with at least one comparison variable representing the predefined limit differential travel;

determining, based on the comparing, that the differential travel between the valve body and the input rod is above the predefined limit differential travel; and based on the determining that the ascertained differential travel is above the predefined limit differential travel, at least of:

activating at least one of a warning display apparatus and a warning sound output apparatus, controlling the electromechanical brake booster out of its current operating mode into a safety mode at least for a predefined first time interval, and interrupting operation of the electromechanical brake booster at least for a predefined second time interval;

wherein the differential travel between the valve body and the input rod is a difference between a position of the input rod with respect to a position of the valve body.

8. The electromechanical brake booster as recited in claim 1, wherein the at least one buffer element is formed from rubber.

9. The braking system as recited in claim 6, wherein the at least one buffer element is formed from rubber.

10. The method as recited in claim 7, wherein the at least one buffer element is formed from rubber.

11. The electromechanical brake booster as recited in claim 1, wherein the internal electronic evaluation system is designed to output, if the differential travel between the valve body and the input rod is above the predefined limit differential travel, the at least one activation signal to the least one of the warning display apparatus and the warning sound output apparatus.

12. The braking system as recited in claim 6, wherein the at least one electronics device is designed to output, if the differential travel between the valve body and the input rod is above the predefined limit differential travel, the at least one activation signal to the least one of the warning display apparatus and the warning sound output apparatus.

13. The braking system as recited in claim 6, wherein the at least one electronics device is designed to output, if the differential travel between the valve body and the input rod is above the predefined limit differential travel, the at least one control signal, and based on the at least one control signal of the electronic evaluation system, the electromechanical brake booster is controlled out of its current operating mode into a safety mode at least for a predefined first time interval, or is interruptible in its operation at least for a predefined second time interval.

14. The method as recited in claim 7, wherein based on the determining that the ascertained differential travel is above the predefined limit differential travel, performing the activating of the at least one of the warning display apparatus and the warning sound output apparatus.

15. The method as recited in claim 7, wherein based on the determining that the ascertained differential travel is above the predefined limit differential travel, performing the controlling of the electromechanical brake booster out of its current operating mode into the safety mode at least for the predefined first time interval.

16. The method as recited in claim 7, wherein based on the determining that the ascertained differential travel is above the predefined limit differential travel, performing the interrupting of the operation of the electromechanical brake booster at least for the predefined second time interval.

* * * * *